March 16, 1926.  
J. BATH  
1,577,099  
ADJUSTABLE INTERNAL GAUGE  
Filed August 3, 1923

Inventor  
John Bath  
By Attorneys.  
Southgate & Southgate

Patented Mar. 16, 1926.

1,577,099

UNITED STATES PATENT OFFICE.

JOHN BATH, OF WORCESTER, MASSACHUSETTS.

ADJUSTABLE INTERNAL GAUGE.

Application filed August 3, 1923. Serial No. 655,523.

*To all whom it may concern:*

Be it known that I, JOHN BATH, a citizen of the United States, residing at Worcester, in the county of Worcester and State of Massachusetts, have invented a new and useful Adjustable Internal Gauge, of which the following is a specification.

This invention relates to an adjustable gauge designed for use in measuring internal diameters. In its general type of construction, the gauge herein shown resembles the adjustable gauge shown in the prior patent to Bath and Grey No. 1,476,681, issued Dec. 11, 1923.

It is the object of my present invention to improve the construction therein shown in many essential details, producing a gauge which may be more easily and economically manufactured and more conveniently assembled, and which has been found extremely reliable and satisfactory in use.

With this general object in view, an important feature of my invention relates to the provision of an internal gauge in which the several parts may be very readily separated for cleaning, repair, or inspection, and in which they may be as easily re-assembled.

Another object of my invention is to provide a construction in which the gauge or contact bars may be easily removed from their supporting and actuating member. I have also provided an improved limit stop for the gauge, a novel size indicator, an improved construction by which a spring is adapted to prevent play or lost motion between certain parts of the gauge, and an improved and elongated bearing surface or support for the gauge bars. I also disclose an attachment by which my improved gauge may be adapted to a wider range of usefulness.

My invention further relates to arrangements and combinations of parts which will be hereinafter described and more particularly pointed out in the appended claims.

A preferred form of the invention is shown in the drawings in which—

Figure 2:
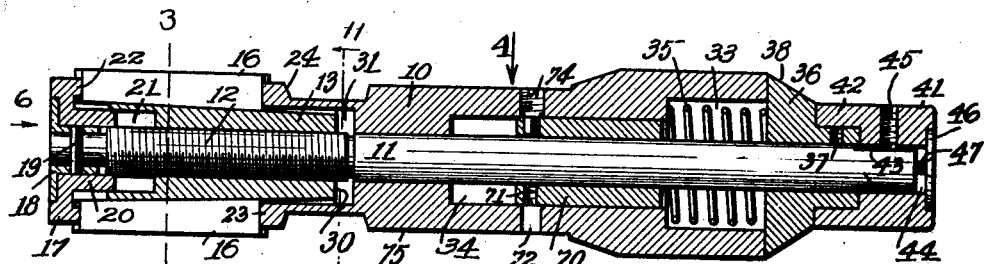
Fig. 2 is a longitudinal sectional view thereof.

Referring to the drawings, my improved gauge comprises a casing or body 10, a shaft 11 mounted for rotation only in said body and having a threaded portion 12, a supporting member 13 threaded on the shaft 11 and having a plurality of dove-tailed inclined guide-ways 15 and a plurality of gauge bars 16 also of dove-tailed cross section. Each of the gauge bars has its inner face inclined to correspond with the inclination of the guide-ways 15 and the gauge bars are movable radially simultaneously by endwise movement of the supporting member 15. In these general features the gauge shown in this application corresponds closely to the gauge shown in the Bath and Grey patent.

A retaining plate 17 is rotatably mounted on the end of the shaft 11 and may be secured in position thereon by a collar 18 secured to the shaft by a cross pin 19. When it is desired to separate the parts, the supporting member 13 is first moved to its extreme right hand position against the end of the casing 10, as viewed in the drawings, and the shaft 11, member 13 and parts associated therewith are then removed from the casing 10. The gauge bars 16 are then caused to slide to the right in the member 13, permitting the projecting portion 20 of the plate 17 to enter a recess 21 in the end of the member 13. Such movement of the plate 17 uncovers the cross pin 19 so that it can be removed and thus release the collar 18. In assembling the parts these same steps are performed in reverse order.

The plate 17 is provided with one or more lugs or projections 22 on its inner face, adapted to enter corresponding slots formed in the adjacent ends of the gauge bars 16. Corresponding lugs or projections 23 are formed on the end flange 24 of the casing 10 (Fig. 5), which projections enter corresponding slots in the other ends of the gauge bars. By the cooperation of the projections 22 and 23 with the slotted gauge bars, angular movement of the gauge bars is prevented, while free radial movement is permitted.

Figures 7, 9:
Fig. 7 is a sectional elevation of certain parts showing a modification.
Fig. 9 is a transverse sectional view of a modified form of indicating device.

In Fig. 7, I have shown a slightly modified construction in which a retaining plate or washer 25 is rotatably mounted on the end of the threaded shaft 11ª and is retained thereon by a head 26 formed integral with the shaft 11ª.

Figure 6:
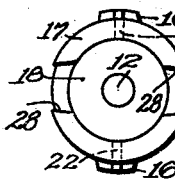
Fig. 6 is an end elevation, looking in the direction of the arrow 6 in Fig. 2.
Figure 3:
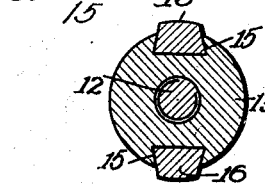
Fig. 3 is a transverse sectional view, taken along the line 3—3 in Fig. 2.

The retaining plates 17 or 25 are preferably provided with one or more recesses 28 (Fig. 6) which are normally out of line with the gauge bars but which can be rotated for alignment therewith when the gauge bars are released from the lugs 22. When thus aligned, the gauge bars may be slipped endwise from the supporting member 13 through the openings or recesses 28, thus affording a very convenient means for separating the parts.

Figure 11:
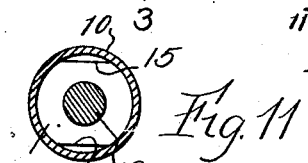
Fig. 11 is a detail sectional view on the line 11—11 in Fig. 1.

The supporting member 13 is provided with a projecting reduced end portion 30 fitting within a recess 31 in the end of the casing 10. The guide-ways or grooves 15 in the supporting member extend also throughout the length of the projection 30, (Fig. 11) thus providing a substantially increased length of bearing for the gauge bars, particularly when the member 13 is moved toward the end of the gauge or to the left in Figs. 1 and 2.

Figure 1:
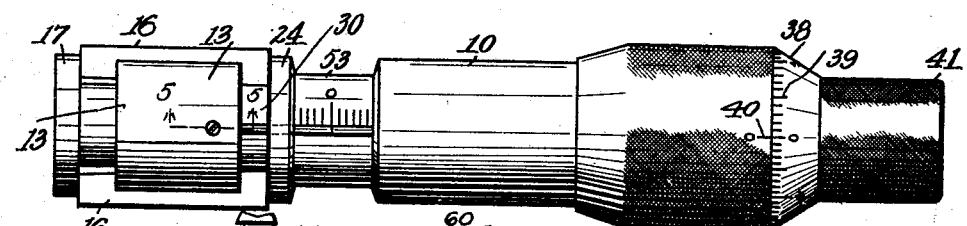
Fig. 1 is a side elevation of my improved gauge.

The casing 10 is also provided at its opposite end with an outer recess or chamber 33 and an elongated inner chamber 34. A compression spring 35 is inserted in the outer recess 33 and is held therein by a collar 36 adjustably secured to the shaft 10 by a headless set screw 37. The collar 36 is also provided with an inclined or conical surface 38 preferably supplied with graduations 39 as indicated in Fig. 1, co-operating with a zero line 40 on the casing to indicate relative gauge adjustment.

A second collar 41 is sometimes provided, said collar having a projecting flange 42 adapted to cover and conceal the adjusting screw 37. The end of the shaft 11 is preferably milled off to provide flat faces, as indicated at 43, and the collar 41 is formed with a correspondingly shaped central opening 44 by which rotation of the collar relative to the shaft is prevented. A set screw 45 may be used to secure the outer collar 41 to the shaft 11 and for further security a washer 46 and screw 47 may be provided. The screw 47 may be used to draw the washer 46 firmly against the end of the collar 41 and also to force the collar firmly against the inner collar 36, before the screw 45 is tightened. By this means, end play of the several parts may be strictly limited, and the spring 35, acting through the shaft 11 and the retaining plate 17, draws the gauge bars 16 firmly against the end flange 24 of the casing 10.

Figure 5:
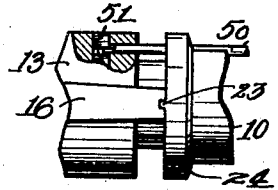
Fig. 5 is a partial longitudinal elevation, broken away along the line 5—5 in Fig. 1.

The graduations 39 commonly indicate one ten-thousandth of an inch each, so that an entire revolution of the shaft 11 and its attached collar 36 represents a change in gauge diameter of only a very small fraction of an inch, commonly either five one-thousandths or one one-hundredth of an inch, according to the size of the gauge. For indicating larger units of gauge adjustment, I provide a sliding rod 50 having one end secured in the supporting member 13 and slidable in a recess formed in the casing 10. A convenient means of securing the rod 50 and member 13 is indicated in Fig. 5, in which the extreme end of the rod is reduced in thickness and extends into an annular groove formed in a clamping stud 51. The casing 10 may be provided with a depressed graduated portion 53, the graduations thereof co-operating with an index line on the rod 50. When the supporting member 13 is moved axially, the index on the rod 50 will be moved along the scale in the casing portion 53 and each division of this scale will correspond to one revolution of the graduated collar 36 and shaft 11.

Figure 10:
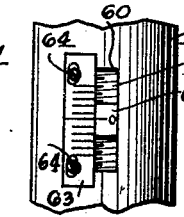
Fig. 10 is a plan view of the parts shown in Fig. 9.

In Figs. 9 and 10 I have shown a somewhat different method of indicating the larger changes in gauge diameter. In this construction, a portion of the gauge casing 10ª is provided with a slot 60 elongated axially of the gauge, and a shaft 11 is provided with a threaded portion 61 underlying the slot. A slide block 62 is mounted in the slot 60 and at its inner end is formed as a partial nut, threaded to engage the portion 61 of the shaft 11. A slotted plate 63 is adjustably secured to the casing 10ª by screws 64 and is provided with graduations co-operating with a zero mark on the block 62. The edge of the plate 63 extends into a recessed corner of the block 62 and prevents outward displacement thereof, while permitting free axial movement.

With this construction it will be evident that rotation of the shaft 11 to move the supporting member 13 axially will produce a corresponding axial movement of the block 62. The parts are so disposed that one revolution of the shaft 11 causes the block 62 to move axially a distance exactly equal to one space of the scale 63.

Figure 4:
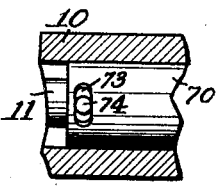
Fig. 4 is a partial sectional view, looking in the direction of the arrow 4 in Fig. 2.

I have also provided means by which outer and inner limits of gauge movement may be determined, thus adapting the gauge for "go and no-go" purposes. To secure this result, I provide a sleeve 70 (Figs. 2 and 4) rotatable on the shaft 11 and fitting within the inner recess 34. The sleeve 70 may be secured in any desired angular position on the shaft by means of a headless set screw 71 which may be tightened or loosened by inserting a small screw-driver through an opening 72 in the casing, especially provided for this purpose. The sleeve 70 has a circumferential slot 73 of any desired length and a stud 74 is threaded in the casing 10 with its reduced inner end adapted to enter the slot 73. When thus positioned, the stud 74 thus limits angular movement of the shaft 11 to the lost motion in the slot 73 and thus provides upper and lower limits of gauge adjustment. The difference in diameter between these limits will be determined by the circumferential length provided in the slot 73.

Figure 8:
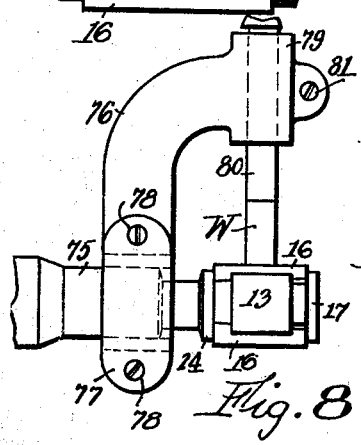
Fig. 8 is a side elevation showing the gauge with an additional support or attachment applied thereto.

The straight cylindrical portion 75 (Fig. 8) of my gauge casing 10 is well adapted to support auxiliary devices for different purposes, one such device 76 being indicated as secured to the gauge by a clamping plate 77 and screws 78. This device 76 is provided with a split bearing 79 for a rod 80, which may be firmly secured in a desired position by a clamping screw 81. My internal gauge is thus readily adapted for externally gauging duplicate pieces of work W, it being merely necessary to turn the gauge to a zero reading and to then adjust the rod 80 with a standard piece W between the end of the rod and the adjacent gauge bar 16. Thereafter the graduations 39 of the gauge will give a relative indication of the variations between different pieces W inserted between the gauge bar and the rod 80. If actual differences in size are desired, it will be necessary to divide the reading of the scale by two, as the scale indicates the combined movements of two gauge bars, while with the attachment, the movement of a single bar only is significant. If desired for external measurements only, all but one of the gauge bars may obviously be removed or omitted. The attachment shown illustrates only a single one of the many analogous purposes to which my improved gauge is readily adapted.

Having thus described my invention and the advantages thereof, I do not wish to be limited to the details herein disclosed otherwise than as set forth in the claims, but what I claim is:—

1. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, a retaining plate rotatably mounted on an end of said shaft and engaging the ends of said bars, and means to draw said plate and bars yieldingly toward the end of said casing.

2. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, a retaining plate rotatably mounted on an end of said shaft and engaging the ends of said bars, and a spring acting on said shaft and casing and effective to draw said plate against said gauge bars and said gauge bars against the end of said casing.

3. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, and a retaining plate rotatably mounted on an end of said shaft and engaging the ends of said bars, said retaining plate having means for non-rotatable engagement with said gauge bars and having recesses adapted for alignment with said gauge bars to permit endwise removal thereof from said supporting member.

4. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, and a plurality of gauge bars each having an inclined inner face adapted to contact with one of said first mentioned inclined faces and each slidable in one of said guide-ways, said casing having an end recess therein and said supporting member having an end portion adapted to enter said recess and said guide-ways being extended in said end portion of said member to provide increased bearing surface for said bars.

5. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, a retaining plate rotatably mounted on an end of said shaft and engaging the ends of said bars, said casing having a recess, a spring in said recess surrounding said shaft, and a collar secured to said shaft and engaged by said spring, said spring acting through said collar, shaft and plate to draw said bars firmly against the end of said casing.

6. An adjustable internal gauge as set forth in claim 5 in which a second collar is secured to said shaft in position to cover the securing means for the first collar and to protect the same from accidental displacement.

7. An adjustable internal gauge as set forth in claim 5 in which a second collar is non-rotatably mounted on the end of said shaft in position to cover and protect the securing means for said first collar and in which means is provided for drawing said second collar firmly against said first collar.

8. An adjustable internal gauge as set forth in claim 5 in which a second collar is secured to said shaft in position to cover the securing means for the first collar and to protect the same from accidental displacement, said first collar having a substantially conical outer portion provided with graduations co-operating with an index on said casing to indicate relative gauge adjustment.

9. An adjustable internal gauge comprising a recessed casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, a sleeve secured to said shaft within the recess in said casing and having a circumferential slot, and a stud in said casing extending into said slot and thereby limiting angular movement of said shaft when thus inserted.

10. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, and an indicating device directly engaged by said shaft and movable axially of said gauge by rotation of said shaft, to indicate relative gauge adjustment.

11. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, and a device directly engaged by said shaft and movable axially of said gauge by rotation of said shaft, said device and said casing having co-operating indications effective to indicate relative gauge adjustment.

12. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, said casing having a slot and said shaft having a threaded portion underlying said slot, a partial nut slidable in said slot and engaged by said threaded shaft portion, and means to secure said nut in position and to indicate its longitudinal position in said slot, thereby indicating relative gauge adjustment.

13. An adjustable internal gauge comprising a casing, a shaft rotatable only in said casing and having a threaded portion, a supporting member threaded on said shaft and axially movable thereby, said member having a plurality of guide-ways therein each having a face inclined longitudinally toward the axis of the shaft, a plurality of gauge bars each having an inclined inner face adapted to contact with one of said first mentioned inclined faces and each slidable in one of said guide-ways, said casing having a slot and said shaft having a threaded portion underlying said slot, a partial nut slidable in said slot and engaged by said threaded shaft portion, said nut having a zero line on its outer face, a graduated plate overlying a portion of said nut to prevent displacement thereof, and co-operating with said zero line to indicate relative gauge adjustment, and means to secure said plate to said casing and to permit longitudinal adjustment thereof.

14. An adjustable gauge comprising a casing, a shaft rotatable only in said casing, a supporting member threaded on said shaft and axially movable thereby, said member having a guide-way therein having a face inclined longitudinally toward the axis of the gauge, a gauge bar having an inclined inner face adapted to contact with said first-mentioned inclined face and slidable in said guide-way, an additional contact member, and means to secure said member in relatively fixed position on said casing for co-operation with said gauge bar in measuring external dimensions.

15. An adjustable gauge comprising a casing, a shaft rotatable only in said casing, a supporting member threaded on said shaft and axially movable thereby, said member having a guide-way therein having a face inclined longitudinally toward the axis of the gauge, a gauge bar having an inclined inner face adapted to contact with said first-mentioned inclined face and slidable in said guide-way, a device adjustably secured on said casing and projecting at one side thereof, a contact rod, and means to adjustably secure a contact rod therein, positioned to co-operate with said gauge bar to measure external dimensions.

In testimony whereof I have hereunto affixed my signature.

JOHN BATH.